United States Patent Office 3,286,796
Patented Nov. 22, 1966

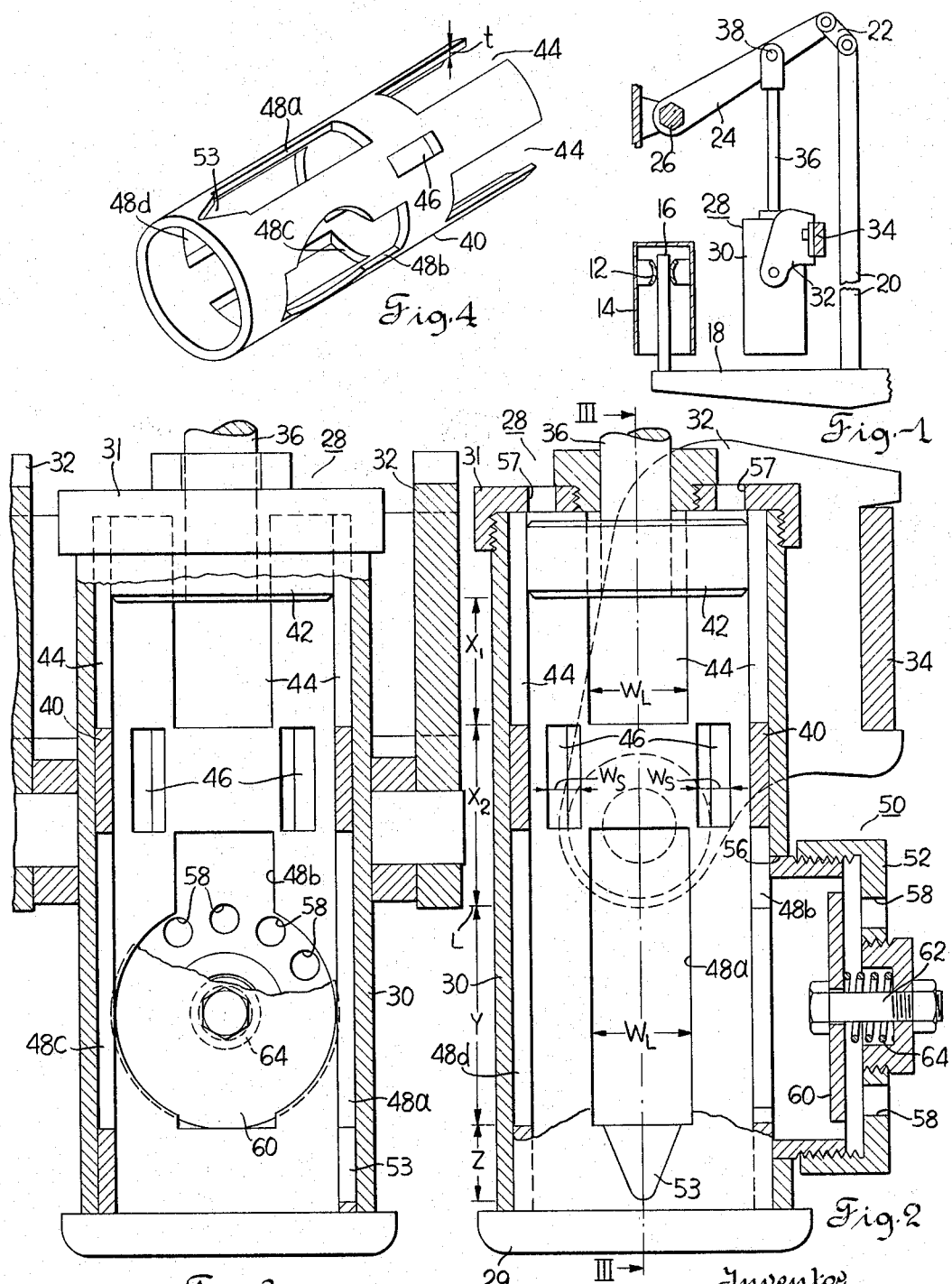

3,286,796
HYDRAULIC SHOCK ABSORBER
Henry L. Peek, Wellesley, Mass., assignor to Allis-Chalmers Manufacturing Company, Milwaukee, Wis.
Filed Dec. 22, 1964, Ser. No. 420,301
5 Claims. (Cl. 188—96)

This invention relates generally to hydraulic shock absorbers and, particularly, to those which are used to control the movement of the movable contacts of electric circuit breakers.

Patent 2,629,462 for Hydraulic Shock Absorber, issued February 24, 1953, to H. L. Peek and assigned to the same assignee as the present application, discloses a hydraulic shock absorber which is advantageously used to control the opening velocity of the movable contacts of an oil type electric circuit breaker to prevent physical damage to the circuit breaker. Generally speaking, that shock absorber is intended to be submerged in oil and comprises an outer cylinder having an inner cylinder or liner snugly fitted therewithin. The liner is provided with an elongated V-shaped opening in one side. A piston movable within the liner is connected to linkage which moves the movable contacts of the circuit breaker. The piston and V-shaped opening cooperate as the piston moves therepast to define an orifice which allows oil to flow from one side of the piston to the other. The gradual decrease in the size of the orifice causes an increase in the resistance to the oil flow therethrough and in this way the movement of the piston and the movable contacts is arrested by a substantially constant force. The shock absorber employs the well known principle that the fluid pressure developed by a piston moving in a cylinder filled with liquid and having an escape orifice for the liquid varies as the square of the piston velocity and inversely as the square of the area of the escape orifice.

It is desirable to exploit the foregoing principle to provide an improved hydraulic shock absorber for use in circuit breakers and other devices which, in addition to slowing down and stopping the piston, also senses and prevents extreme initial piston velocities but senses and tolerates normal initial piston velocities. Such an improved shock absorber can be used with an oil circuit breaker to control contact velocity in order to keep the movable contacts within the arc interrupting devices long enough to extinguish the arcs when otherwise they might be expelled due to the forces of the arc.

In accordance with the present invention there is provided a hydraulic shock absorber having a housing or outer cylinder wherein a snug fitted inner cylinder or liner is disposed. A piston is disposed within the inner cylinder and is connected to a linkage which opens the movable contact of a circuit breaker. The inner cylinder is provided with at least one wide hole near one end, with at least one narrower hole near its midportion, with at least one wise hole near its other end, and with at least one V-shaped wide hole near the other end. A normally open pressure responsive valve communicates between the interior and exterior of the shock absorber. As the circuit breaker contacts open, the piston is also moved therewith. As the piston moves past each hole in the liner, it cooperates therewith to define an orifice for the flow of oil from one side of the piston to the other. The size of the orifice determines the amount of oil flow and consequently has no effect on piston and contact velocity. As the piston starts to move and before it gets up to full speed, it passes the wide hole near the end of the inner cylinder to define a large orifice and consequently there is substantially no retarding force acting upon the piston. During the next portion of the piston stroke when high arcing currents cause the contacts and the piston to tend to accelerate to high speed, the piston is passing the narrower hole and its velocity is thereby limited to, for example, 1½ times no-load velocity. However, if arcing currents are so high as to cause contact and piston velocity to tend to exceed 1½ times no-load velocity, the hydraulic forces generated in the oil in front of the piston effect closure of the pressure responsive valve and prevent piston velocity from increasing. During the next portion of the piston stroke when arcing currents are no longer acting on the contacts to increase piston velocity, the piston is passing the wide hole near the bottom of the inner cylinder and no substantial retarding force acts on the piston. During the final portion of the piston stroke it passes the V-shaped hole and the increase in retarding force causes the piston and contacts to decelerate and stop.

It is an object of the present invention to provide an improved hydraulic shock absorber wherein piston velocity is regulated so as to prevent extreme increases in initial velocities while tolerating normal increases in initial velocities.

Another object is to provide a shock absorber of the aforesaid character which is sensitive to abnormal pressure increases from the beginning of the piston movement and reacts thereto to bring such pressure increases under control.

Another object is to provide a shock absorber of the aforesaid character wherein piston velocity and pressure build-up determine which of several available orifices for the escape of liquid is selected to effect control of piston movement.

Another object is to provide a hydraulic shock absorber of the aforesaid character for use with an oil circuit breaker to regulate opening of the movable contacts in such a way that the movable contacts do not leave the arc interrupting device even when subjected to high arcing currents until the arc is extinguished.

Another object of the invention is to provide a hydraulic shock absorber of the aforesaid character which does not require significant energy from the circuit breaker operating mechanism to operate, which does not significantly alter the no-load opening velocity of the circuit breaker contacts, which limits opening velocity to a maximum of 150% of no-load velocity, which does not reduce opening velocity below no-load velocity during the first 80% of the opening stroke, and which reduces opening velocity to zero with a substantially constant retarding force during the final 20% of the opening stroke.

Other objects and advantages of the invention will hereinafter appear.

The accompaying drawing illustrates a preferred embodiment of the invention but it is to be understood that the embodiment illustrated is susceptible of modification with respect to details thereof without departing from the scope of the appended claims.

In the drawing:

FIG. 1 is a view showing a portion of an oil circuit breaker employing a hydraulic shock absorber incorporating the present invention;

FIG. 2 is an enlarged cross sectional view of the shock absorber shown in FIG. 1;

FIG. 3 is a cross sectional view taken along line III—III of FIG. 2; and

FIG. 4 is a perspective view of the inner cylinder of the shock absorber shown in FIGS. 1, 2 and 3.

FIG. 1 of the drawing shows a portion of a typical oil circuit breaker which comprises at least one stationary contact 12 mounted within an arc interrupter 14. Interrupter 14 is understood to be completely submerged in a fluid such as oil which aids in extinguishing the arc generated in the interrupting device during contact opening. Stationary contact 12 is cooperable with a movable bayonet type contact 16 which is mounted on and movable with a crossbar 18. Crossbar 18 is connected to a reciprocably movable push rod 20 which is connected through a link 22 and a crank 24 to a rotatable operating shaft 26. FIG. 1 shows the circuit breaker contacts 12 and 16 in closed position. During a no-load opening operation, opening springs (not shown) effect clockwise rotation of shaft 26 to cause movable contact 16 to move out of engagement with stationary contact 12 and then out of arc interrupter 14 at a certain no-load velocity which depends on the force of the opening springs, the mass of the system and so forth. Opening of contacts 12 and 16 during a fault condition is attended by magnetic effects and vapor pressures within interrupter 14 which tend to cause movable contact 16 and its associated mechanical system to move at increased velocity. A small fault, for example, tends to cause about a 30% increase over no-load velocity. A large short circuit fault tends to cause about a 130% increase over no-load velocity which could result in damage to the circuit breaker. Furthermore, a 130% increase in velocity is so great that movable contact 16 would be forced out of interrupter 14 before there was time for the arc to be extinguished by the action of the oil within the interrupter.

In accordance with the present invention there is provided means, such as a hydraulic absorber 28, for controlling the angular velocity of crank 24 and, thus, the opening velocity of movable contact 16 and its associated mechanical linkage. Shock absorber 28, like interrupter 14, is understood to be completely submerged in the oil in the circuit breaker. Shock absorber 28 comprises a housing 30 which is pivotally mounted on a support bracket 32 and the latter is rigidly secured to a stationary portion 34 of the circuit breaker. Shock absorber 28 further comprises a piston rod 36 which is pivotally connected at one end as by a pin 38 to crank 24.

Referring now to FIGS. 2 and 3, it is seen that housing 30 of shock absorber 28 takes the form of a hollow outer cylinder which is suitably closed at each end by closing member 29 and 31. A hollow inner cylinder 40 is coaxially disposed within outer cylinder 30 in close fitting relationship and is immovable with respect thereto. A piston 42 is disposed within inner cylinder 40 and is connected to the other end of piston rod 36.

Inner cylinder 40, which is shown separately in FIG. 4, is provided with a plurality of holes extending through the walls thereof which cooperate with piston 42 as the latter moves therepast to define escape orifices which permit fluid to escape from one side of the piston to the other. When piston 42 is at any given position in inner cylinder 40, the total area of the orifices is a product of the thickness (see FIG. 4) of the inner cylinder wall times the sum of the widths of the several holes with which the piston is then adjacent.

Inner cylinder 40 has four holes 44 radially arranged around a first portion or region thereof, four holes 46 radially arranged around a second portion thereof, four holes 48a, 48b, 48c and 48d radially arranged around a third portion thereof, and a V-shaped hole 53 which is an extension of hole 48a and is located in a fourth portion of the inner cylinder. The holes 46 are substantially narrower than the holes 44 and the holes 48a, b, c and d. Each hole 44 and 48 has a width $W_L$ and each hole 46 has a width $W_S$, as FIG. 2 shows. The escape orifice areas are proportioned, as hereinafter explained, so that they regulate the flow rate and pressure of oil in inner cylinder 40 and as a consequence regulate the velocity of piston 42.

For convenience, FIG. 2 shows that the distance between the face of piston 42 and the bottom edges of the holes 44 is designated as $X_1$. The distance between the top and bottom edges of the holes 46 plus the distance between the bottom edges of the holes 46 and a line L (i.e., the thickness of piston 42) is designated as distance $X_2$. The distance between line L and the bottom edges of the holes 48 is designated Y. The distance between the top and bottom edges of V-shaped hole 53 is designated Z.

The escape area $W_L t$ is so proportioned that during the portion of the stroke $X_1$ before contact 16 gets up to speed and again during the portion of stroke Y after contact 16 leaves interrupting device 14, the width $W_L$ is so large that there will be substantially zero retarding force acting on piston 42.

During the portion of the stroke $X_2$, however, when high arcing currents normally accelerate contact 16 to high speeds, the escape area $W_S t$ is small and of such value that it will limit the opening velocity during interruption of the highest currents within the breaker rating to a maximum of 1½ times no-load velocity. It is found that the escape area size required to do this, however, reduces any velocity at start of the $X_2$ portion of the stroke to 1/1.31 or to 76.4% of that velocity at the end of $X_2$ portion of the stroke.

Since this is too great a velocity change during the first 80% of the opening stroke and is in fact below no-load velocity, something additional must be provided, such as a valve 50 hereinafter described, to cause the shock absorber to sense the increased velocity and discriminate so as to provide the additional retarding force only when velocity approaches 1½ times normal velocity.

In order that negligible retarding force will be exerted by shock absorber 28 during the closing of the circuit breaker, holes 57 with at least the total area of holes 58 are drilled in the upper end 31 of housing 30 to provide a large escape area above piston 42 during the whole breaker closing stroke.

Shock absorber 28 is provided with normally open valve 50, hereinbefore referred to, which affords a path for fluid flow between the interior of inner cylinder 40 and the exterior of outer cylinder 30. Valve 50 is adapted to close when the fluid pressure within inner cylinder 40 exceeds a predetermined magnitude to prevent fluid flow from the shock absorber. Valve 50 is adapted to open when the fluid pressure falls below the predetermined magnitude. Valve 50 comprises a hollow housing 52 which is secured to the side of outer cylinder 30. A hole 56 in outer cylinder 30 registers with hole 48b in inner cylinder 40 to afford a path for fluid flow between the interior of inner cylinder 40 and the interior of valve housing 52. Housing 52 of valve 50 is provided with a plurality of openings 58 in one end thereof which afford a path for fluid flow between the interior and exterior of the valve housing. A valve closure plate 60 is supported adjacent the openings 58 on a valve stem 62 which is slidably supported by housing 52. A compression spring 64 surrounds valve stem 62 and bears against valve housing 52 and closure plate 60 to maintain the latter in valve open position. The openings 58 in valve 50 are sufficiently large and numerous to afford no substantial resistance to the flow of oil from out of shock absorber 28.

The spring 64 of valve 50 is so designed as to prevent the valve from closing until a velocity of approximately $\sqrt{2}$ times the no-load velocity is reached. When the valve is open, holes 58 provide sufficient escape area that the retarding force of the piston is negligible.

When the velocity of piston 42 reaches 1.414 times no-load velocity, however, the closing force on the valve doubles. Spring 64 is designed to respond to this double force and close off the holes 58, leaving only the escape area $W_s t$ during the $X_2$ portion of the stroke. The escape area $W_s t$ is designed such that, if a velocity of 1.414 times no-load causes valve 50 to close, breaker will still be slowed only to approximately no-load velocity during the $X_2$ portion of stroke. When piston 42 enters the Y portion of stroke, escape area $W_L t$ in inner cylinder 40 is so large that substantially zero retarding force is offered to movable contact 16 after the latter leaves interrupting device 14.

During closing of breaker, all holes 58 are open so that substantially zero retarding force is offered.

The invention disclosed herein operates in the following manner. First assume that the oil circuit breaker is closed, as shown in FIG. 1, and that then a fault condition occurs which causes it to open by effecting clockwise rotation of shaft 26 and crank 24 and corresponding movement of the associated elements.

When the movable contact 16 is starting from rest and accelerating to no-load velocity, energy is provided by opening springs (not shown) to overcome the considerable friction of stationary contact 12 and to accelerate movable contact 16 to normal no-load opening velocity. During this initial portion of the breaker stroke piston 42 traverses the portion of the stroke designated $X_1 t$ plus the area of holes 58 and is so large that negligible retarding force is exerted by shock absorber 28 on the circuit breaker.

If only a small fault current is being interrupted by the circuit breaker contacts 12 and 16 such that normal velocity is increased no more than approximately 30% during the $X_1$ portion of the piston stroke, the area $W_S t$ plus the area of holes 58 will be the escape area as the arc lengthens during the $X_2$ portion of the stroke. Pressure built up under piston 42 will still be insufficient to close plate 60 of valve 50 against its spring 64, and the retarding force of the shock absorber, though slightly greater than during $X_1$ portion of stroke, still permits contact velocity to be maintained at approximately 30% above normal velocity.

If, however, higher values of short circuit current are being interrupted, the contact 16 will be accelerated by both magnetic action and by hydraulic pressures built up inside the interrupting device 28 so that piston 42 is urged to higher velocities. If these higher contact velocities are not controlled, they will reach destructive levels. The valve spring 64 is so designed that when the piston velocity during the $X_2$ portion of the stroke increases slightly beyond 130% of no-load velocity enough pressure is produced below piston 42 to overcome the force of valve spring 64 and close valve 50, thus blocking off the escape area through holes 58 of valve 50, leaving only escape area $W_S t$. The area $W_S t$ is calculated so as to control breaker contact velocity below 150% of no-load velocity up to maximum short circuit current rating of circuit breaker.

During the $X_1$ and $X_2$ portion of the piston stroke, the movable contact is within its interrupting device 14 and during Y and Z portion it is withdrawn from the interrupting device. No-load speed curves show that breaker without the shock absorber reaches no-load velocity during the $X_1$ portion of stroke and interrupting speed curves show that the movable contact is accelerated to very high velocities during the $X_2$ portion of the stroke due to high pressures generated by the arc inside the interrupting device which expels the contacts with great force from the interrupting device.

When piston 42 reaches Y portion of the piston stroke, the top of contact 16 has reached the bottom of interrupting device 14 and the arc is already interrupted. Therefore, there is no further need to retard the opening movement of the movable members. The escape area during the Y portion of the piston stroke is therefore enlarged again to $W_L t$.

After the contact leaves interrupting devices (Y portion of the stroke), it receives substantially zero additional acceleration.

As contact 16 approaches the end of its stroke, piston 42 begins to enter the Z portion of its stroke. The fluid escape area during the Z portion of piston stroke is designed according to principles explained in the aforementioned U.S. Patent 2,629,462 to bring the movable contact 16 and its associated mechanism to a stop without rebound and with minimum stresses.

The escape area $W_L$ is designed to approach a theoretical parabolic shape which gives constant retarding force during the final portion of the stroke. A constant retarding force during deceleration results in the lowest stresses on breaker moving parts.

The embodiments of the invention in which an exclusive property or privilege is claimed are defined as follows:

1. In a hydraulic shock absorber, a hollow cylinder, a piston movable in said cylinder, said cylinder having passageway means formed in the inside surface thereof for cooperating with said piston to define an orifice for accommodating the flow of liquid past said piston as the latter is moved, said passageway means being shaped so as to provide an orifice of variable size as said piston moves in said cylinder, normally open valve means communicating between the interior and exterior of said cylinder, and means for biasing said valve means open, said valve being adapted to close against the bias of said biasing means in response to fluid pressure of predetermined magnitude within said cylinder while said piston moves through said cylinder in one direction to provide an orifice of predetermined size, said valve being further adapted to reopen in response to the bias of said biasing spring when said piston continues to move in said one direction through said cylinder to provide an orifice different in size than said predetermined size.

2. A shock absorber according to claim 2 wherein the magnitude of said pressure at any instant is determined by the velocity of said piston and the size of the orifice.

3. In a hydraulic shock absorber, a hollow cylinder, a piston movable in said cylinder, said cylinder having passageway means formed in the inside surface thereof for cooperating with said piston to define an orifice for accommodating the flow of fluid past said piston as the latter is moved, said passageway means being shaped so as to provide an orifice of predetermined size when said piston moves through a first portion of said cylinder, to provide an orifice smaller than said predetermined size when said piston moves through a second portion of said cylinder, to provide an orifice of said predetermined size when said piston moves through a third portion of said cylinder, and to provide an orifice of diminishing size when said piston moves through a fourth portion of said cylinder, and normally open valve means communicating between the interior and exterior of said cylinder, said valve means being adapted to close in response to fluid pressure of predetermined magnitude while said piston moves through said second portion of said cylinder and to open after said piston moves into said third portion of said cylinder.

4. In a hydraulic shock absorber, a hollow cylinder, a piston movable in said cylinder, said cylinder having at least one recess formed in the inside surface thereof in each of four contiguous portions of said cylinder for cooperating with said piston to define an orifice for accommodating the flow of fluid past said piston as the latter is moved from the first portion of the cylinder to the fourth, all said recesses being of the same depth, the recesses in the first and third portions being of predetermined width, the recess in the second portion being less than said predetermined width, and the recess in the fourth portion being tapered, and normally open valve means communicating between the interior and exterior of said cylinder, said valve means being adapted to close in response to fluid pressure of predetermined magnitude while said piston moves through said second portion of said cylinder.

5. In a hydraulic shock absorber, a hollow outer cylinder, a hollow inner cylinder coaxially and rigidly mounted within said outer cylinder and having an outside diameter substantially the same as the inside diameter of said outer cylinder, a piston movable in said inner cylinder and having a diameter substantially the same as the inside diameter of said inner cylinder, a plurality of apertures extending through the wall of said inner cylinder for cooperating with said piston to define orifices for accommodating the flow of fluid past said piston as the latter is moved through said inner cylinder, at least one aperture being located in each of four contiguous portions of said inner cylinder, the aperture in the first and third portions of said inner cylinder being of predetermined width, the aperture in the second portion of said inner cylinder being less than said predetermined width, and the aperture in the fourth portion of said inner cylinder being tapered and less than said predetermined width, and normally open valve means communicating between the interior of said inner cylinder and the exterior of said outer cylinder, said valve means being adapted to close in response to fluid pressure of predetermined magnitude while said piston moves through said second portion of said cylinder.

References Cited by the Examiner

UNITED STATES PATENTS

| | | | |
|---|---|---|---|
| 1,744,514 | 1/1930 | Thompson | 188—88 |
| 2,629,462 | 2/1953 | Peek | 188—96 |

FOREIGN PATENTS

| | | |
|---|---|---|
| 301,761 | 12/1928 | Great Britain. |
| 722,994 | 2/1955 | Great Britain. |

MILTON BUCHLER, *Primary Examiner.*

G. E. A. HALVOSA, *Assistant Examiner.*